March 28, 1950     J. A. MISENER     2,501,956
DIFFERENTIAL LOCKING DEVICE
Filed Nov. 25, 1947     3 Sheets-Sheet 1
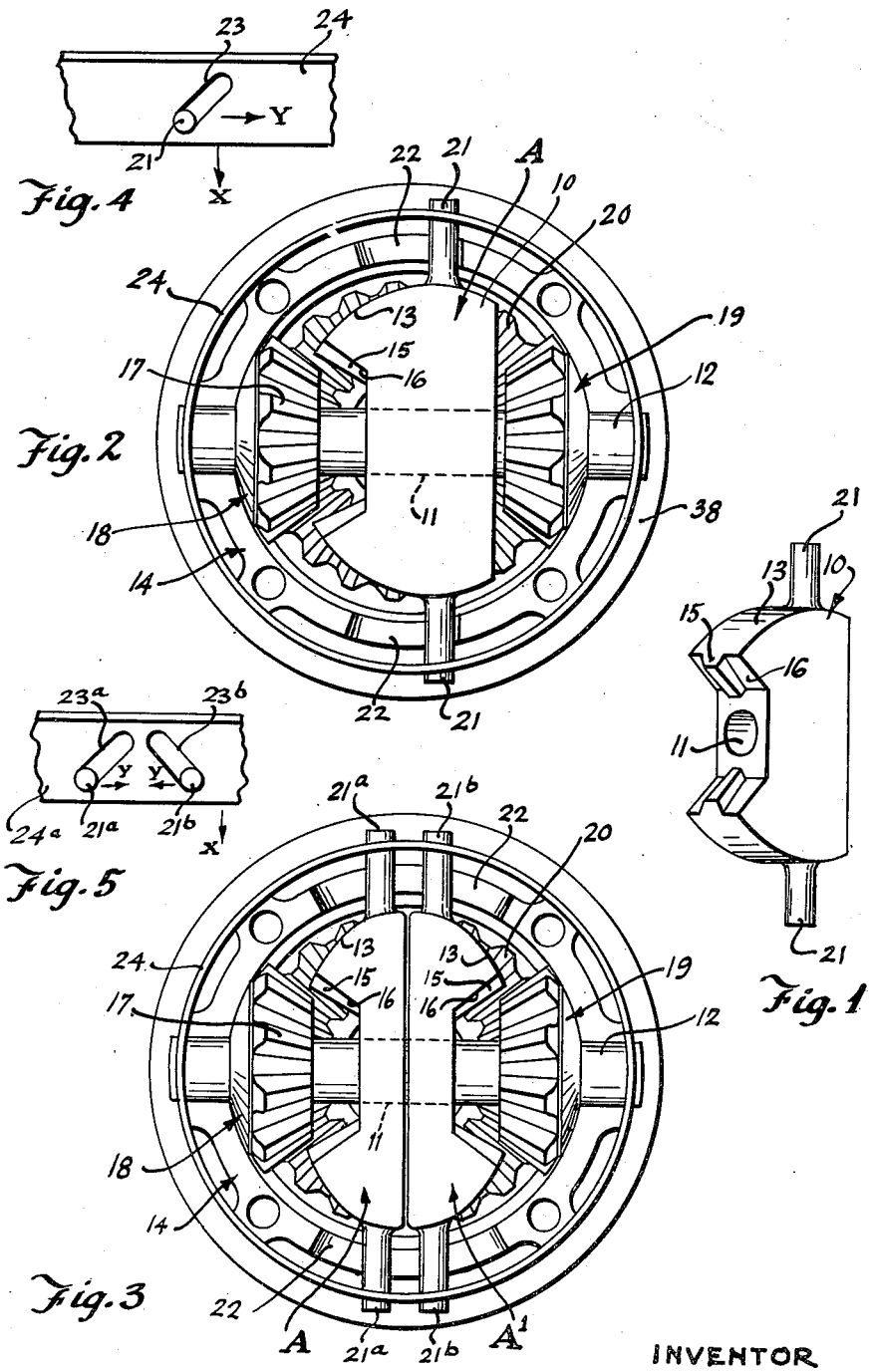
INVENTOR
J. A. MISENER
By: Fetherstonhaugh & Co.
ATT'YS March 28, 1950 J. A. MISENER 2,501,956
DIFFERENTIAL LOCKING DEVICE
Filed Nov. 25, 1947 3 Sheets-Sheet 2

INVENTOR
J. A. MISENER
By: Fetherstonhaugh & Co.
ATT'YS

March 28, 1950  J. A. MISENER  2,501,956
DIFFERENTIAL LOCKING DEVICE
Filed Nov. 25, 1947  3 Sheets-Sheet 3

INVENTOR
J. A. MISENER
By: Fetherstonhaugh & Co.
ATT'YS

Patented Mar. 28, 1950

2,501,956

UNITED STATES PATENT OFFICE 2,501,956

DIFFERENTIAL LOCKING DEVICE

Joseph A. Misener, Niagara Falls, Ontario, Canada

Application November 25, 1947, Serial No. 787,951

5 Claims. (Cl. 74—710.5)

This invention relates to a locking means for differential gears.

Formerly, various designs of locking devices have been devised for locking differential gears to cause the two live axle sections to rotate as a unit; means being provided for operating the locking mechanism from a point convenient to the driver's seat. All of such prior locking mechanisms, however, have required changes and alterations to be made in the design of differential housings, gear mountings, and the like, resulting in such mechanisms experiencing disfavor with automobile manufacturers in particular. Also, devices formerly known have the general characteristics of being unduly complicated and expensive to manufacture.

It is an object of the present invention to provide differential locking means which may be mounted on most types of automotive vehicles after manufacture of the latter, and which is particularly adaptable for military vehicles and the like in service in areas where it is desirable to have the two live axle sections rotate as a unit such as in areas of heavy rainfall or where other adverse weather conditions occur, where maximum traction is required.

Another object of the invention is to provide differential locking means comprised of a minimum of elements including essentially, a locking block, sleeve housing, a modified design of differential pinion shaft, and means for actuating the locking means into and out of engagement with at least one differential transfer gear.

A further object of the invention is to provide differential locking means as before which may be mounted in any differential assembly where there is a reasonable clearance between the pinion gear and the differential case to accommodate the sleeve housing.

A still further object of the invention is to provide a differential locking device as described, which may be mounted by any skilled mechanic on most types of differential gear mechanisms without modifying the original structure of the differential gear mechanism and by merely adding the elements of the invention thereto.

Other objects of the invention will be revealed by a study of the following specification taken in conjunction with the accompanying drawings.

In the drawings:

Figure 1 is a perspective view of a locking block according to my invention.

Figure 2 is a view of a locking block assembly which includes the differential gears of a conventional differential gear mechanism as well as the differential case and the sleeve housing of the present invention.

Figure 3 shows the corresponding elements to Figure 2 but reveals the mode of use of two locking blocks.

Figure 4 is a partial view of the sleeve housing used in Figure 2 showing the angular slot designed for engagement with the actuating rod.

Figure 5 is a partial view of the sleeve housing for the embodiment shown in Figure 3.

Figure 6:
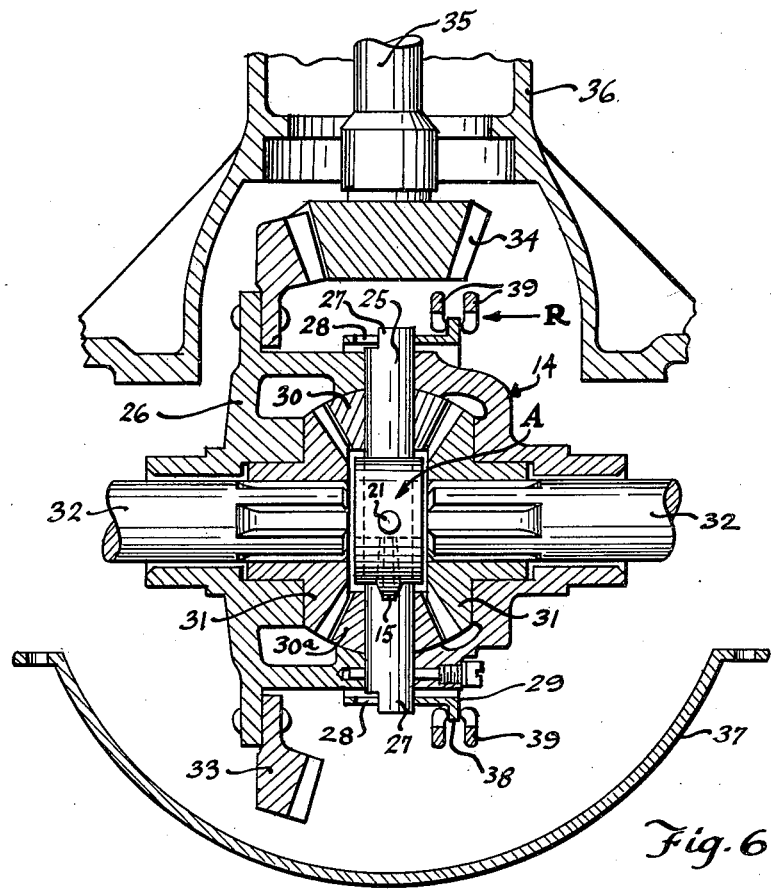
Figure 6 is a view of a completely conventional gear mechanism with the device of the present invention mounted therein.

Referring more specifically to the drawings, and particularly to Figures 1 and 2, the locking block A of my invention comprises a body 10 having an axial bore 11 designed to slidably receive the differential pinion shaft 12. The peripheral surfaces 13 are contoured for clearance with the inner surfaces of differential case 14. Inclined dogs 15 extending from the inclined surfaces 16 of body 10 are designed to engage between the teeth 17 of differential transfer gear 18. Transfer gears 18 and 19 engage the differential gears 20 so that when the dogs 15 of locking block A engage the teeth 17 of gear 18, gear 18 will be fixed against rotation on differential pinion shaft 12 and therefore differential gear 20 will cause the complete assembly described to rotate with it.

Figure 12:
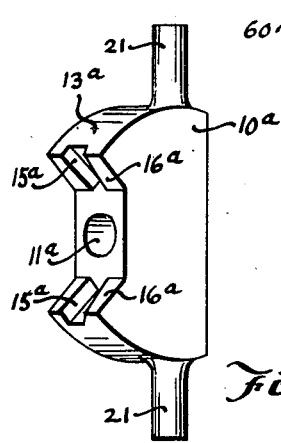
Figure 12 is a perspective view of an alternative form of locking block.

Figure 12 shows an alternative form of locking block having a body 10a, peripheral surfaces 13a and bore 11a as before. In this case however, recesses 15a are formed in the inclined surfaces 16a designed to receive teeth 17 rather than to engage between the same, as the dog 15 functions in the former and remainder of this description.

Engagement and disengagement of dogs 15 with the teeth 17 of gear 18 is determined by slidable movement on the differential pinion shaft 12. In order to accomplish this function, I provide actuating rods 21 extending from the body 10, and through slots 22 in the differential case 14 to be engaged by the angularly disposed slots 23 in the movable sleeve housing 24, this detail being shown more clearly in Figure 4. In the latter figure as sleeve housing 24 is moved axially in the direction of arrow X, the actuating rods 21 will be caused to move in direction Y to cause disengagement of dogs 15 from gear 18 in Figure 2.

In this last figure, the block A is shown disengaged and therefore the sleeve housing 24 would be caused to move axially away from the viewer to provide axial movement of the block A for engagement of the dogs 15 with teeth 17 of gear 18.

A modification is shown in Figures 3 and 5 where two locking blocks A and A1 are employed, which have actuating rods 21a and 21b as before which engage angularly disposed travel slots 23a and 23b of the sleeve housing 24a. It will be apparent that the movement shown by the arrows X and Y, Figure 5, will occur upon actuation of the sleeve housing described.

It may be pointed out that it will be necessary to replace one part of a conventional differential gear mechanism and in order to show clearly what is required, Figure 6 is included. In this latter figure it will be observed that the conventional differential pinion shaft (not shown) must be replaced with a differential pinion shaft 25 which extends outside of the differential case 26 to present lugs 27 which are designed to engage in axial slots 28 in sleeve housing 29. This, however, will not require modification in the design of the differential case 26. In this figure as before, the differential pinion shaft supports the differential transfer gears 30 and 30a which engage the differential gears 31 which are mounted on the live axle shafts 32. The differential case 26 conventionally mounts the ring gear 33 which is designed to be engaged by pinion 34 of drive shaft 35. The latter is carried by the differential carrier 36 which serves as a stationary housing for the unit, a conventional bell housing 37 serving as the well known rear closure for the assembly.

An important essential of the sleeve housing of my invention is that some means be provided for causing actuation of the same axially such as a collar 38 extending from the sleeve housing 29 and engageable by the fingers 39 of the bifurcated actuating lever 40.

Figures 7, 8:
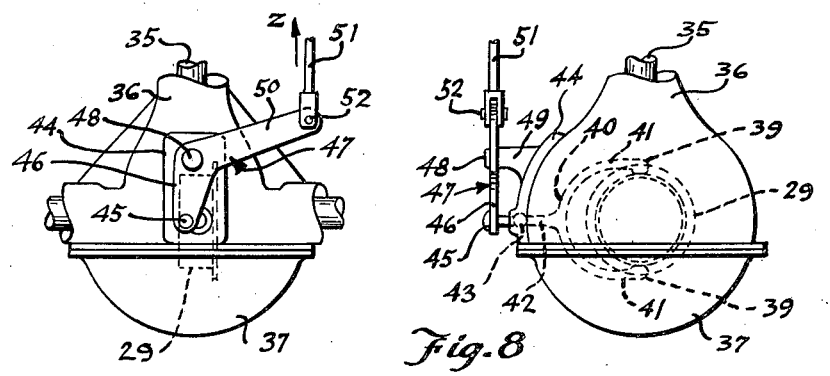
Figure 7 is an external plan view of a conventional differential with the present device incorporated therein showing one means of actuating the same.
Figure 8 is an elevation of Figure 7.
Figure 9:
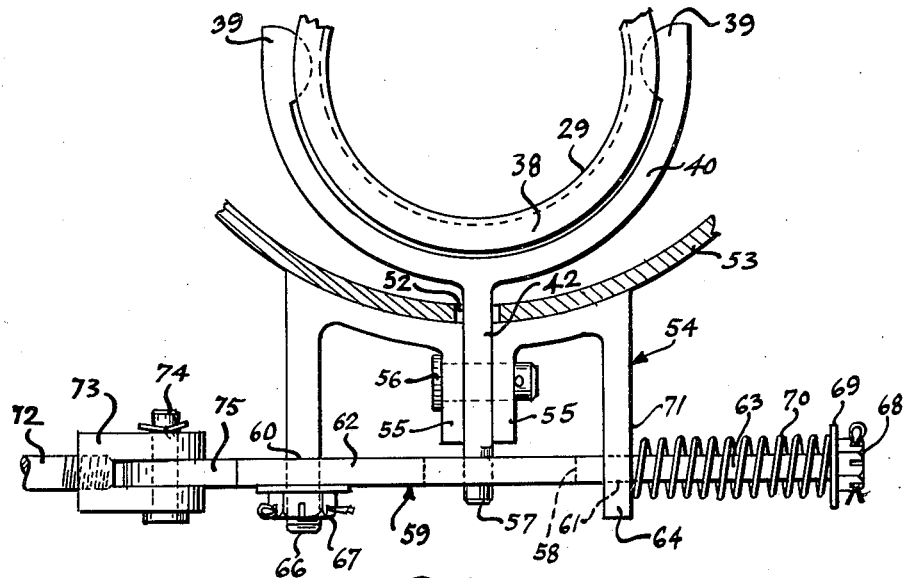
Figure 9 is an elevation of alternative means of actuating the locking device of the present invention.

The actuating lever is most clearly shown in Figures 8 and 9 and has arms 41 and throat 42, the latter extending through an enlarged bore drilled in the differential carrier for ball swivel pivot connection 43 in the bracket mounting means 44 of Figure 8. The actuating end of the throat or lever arm 42 pivotally engages as at 45 in the arm 46 of bell crank lever 47. The latter lever is pivotally connected as at 48 on the standard 49 of bracket 44, the arm 50 (Figure 7) thereof connecting to the control rod 51 by suitable pin means 52. The control rod 51 extends to suitable lever mechanism well shown in the prior art for causing its actuation by an operator at the steering wheel of a vehicle. It will be apparent that movement of control rod 51 in direction Z will cause the fingers 39 (Figure 6) to move the sleeve housing 29 axially in the direction of arrow R to provide engagement of dogs 15 of locking block A in the teeth of transfer gear 30a.

The mechanism I have so far described which is pertinent to my invention may be mounted on an already manufactured differential gear mechanism by a skilled mechanic by merely disassembling the conventional gear mechanism and mounting the locking block as described, replacing the differential pinion shaft with the modified form shown. Providing the differential is of the class where sufficient space is allowed for the sleeve housing 29, this is also assembled, and a hole is drilled in the differential carrier to allow free passage of the throat 42 and the bifurcated lever 40. Bracket 44 is then fastened to the differential carrier by any suitable means such as welding or bolting and the lever mechanism described may be fitted to cause actuation of the sleeve housing in the desired manner.

Figure 11:
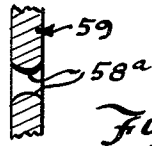
Figure 11 is a partial sectional view 11—11 of Figure 10.
Figure 10:
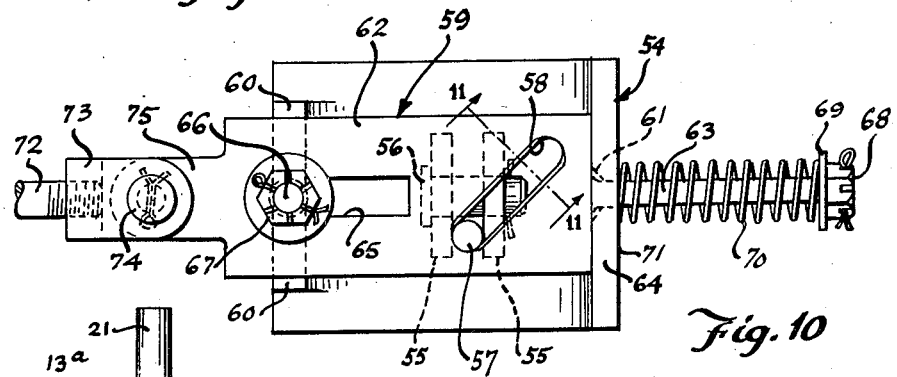
Figure 10 is a plan view of the actuating means of Figure 9.

Many alternatives are of course, possible in the specific means employed for actuation of the device of my invention and since I conceive my device as comprising a number of elements which may be attached to an automobile, I also disclose another alternative or modification in the actuating means in Figures 9, 10 and 11.

In Figure 9, the bifurcated lever 40 is shown with the throat 42 extending through an enlarged bore 52 in the differential carrier 53. A bracket 54 having bracket arms 55 provides a pivot 56 as a fulcrum for the bifurcated lever 40. The free end 57 of throat 42 engages the angularly disposed travel slot 58 of the actuating bar 59. Bar 59 is slidable axially on shoulders 60 and bore 61 by its body 62 and extending shaft portion 63 in the arms 64 of bracket 54. The travel of bar 59 is limited by the limiting slot 65 which receives the stud 66 which is threaded for reception of the nut 67. Shaft 63 extends to receive the threaded nut 68 and washer 69 to confine compression spring means 70 between the washer and the surface 71 of bracket arm 64. Control rod 72 connects pivotally by means of bifurcated block 73 and pin 74 to the extended portion 75 of the actuating bar 59. The position of the elements shown corresponds to the disengaged position of the locking block with the differential transfer gears formerly described. It is desirable that the slot 58 of the actuating bar 59 have rounded inner contours 58a as shown in Figure 11. As before, the bracket 54 may be fastened to the differential carrier by any suitable means, such as welding or bolting.

I have described my invention in such a manner that the attainment of its objects will be evident. Where possible, alternatives of structure have been shown in order to facilitate skilled persons in the design of units according to my invention. It will be appreciated however, that it may be necessary to provide devices of slightly varying dimensional characteristics or provide slight variations from the structure shown as the design of differentials changes throughout the years. It will however, be apparent that my invention specifically concerns the provision of means whereby a substantially conventional differential gear mechanism may be converted by an ordinary skilled mechanic to a locking type of differential. It is therefore possible to provide the units of my invention as a kit which may be carried along with military stores, or may be sold by automobile service depots as a unit which may be installed upon order. It is therefore intended that the present disclosure should not be construed in any limiting sense other than that indicated by the scope of the following claims.

What I claim as my invention is:

1. A differential locking device designed for application to conventional differential gear mechanisms comprising a differential pinion shaft and studs extending from the ends thereof, at least one locking block slidably mounted on said differential pinion shaft between the differential pinions, means on said locking block designed for engagement with the teeth of one of the differential gears, a sleeve housing having axial slots for reception of said stud ends of said differential pinion shaft and designed for axial movement at right angles to the axial movement of said block, said sleeve housing being operatively connected to said locking block and designed to cause axial movement of the same along said pinion shaft upon actuation of said sleeve housing axially and at right angles to said differential pinion shaft, and means for actuating said sleeve housing.

2. A differential locking device designed for application to conventional differential gear mechanisms which include differential transfer gears operatively engaging opposed differential gears and a differential case housing said gears, and comprising, a differential pinion shaft mounted in said differential case and extending outwardly thereof, at least one locking block having an axial bore whereby the same may be slidably mounted on said differential pinion shaft, means extending from said locking block designed for engagement with the teeth of one of said differential gears, a sleeve housing having axial slots designed for reception of the extending ends of said differential pinion shaft and movable at right angles to the axial movement of said locking block, said sleeve housing being operatively connected to said locking block to provide axial movement of the same along said pinion shaft, and means for actuating said sleeve housing.

3. A differential locking device as claimed in claim 2 in which the operative connection between said sleeve housing and said locking block comprises angularly disposed travel slots in said housing and means extending from said block for engagement with said slots, whereby actuation of said sleeve housing in its axial direction moves said locking block along said differential pinion shaft.

4. A differential locking device as claimed in claim 2, in which the engaging means on said locking block comprises a pair of opposed dogs designed to engage between the teeth of an adjacent differential gear.

5. A differential locking device as claimed in claim 2 in which the engaging means of the locking block comprises a pair of opposed slots adapted to receive the teeth of an adjacent differential gear.

JOSEPH A. MISENER.

REFERENCES CITED

The following references are of record in the file of this patent:

UNITED STATES PATENTS

| Number | Name | Date |
| --- | --- | --- |
| 1,110,437 | Golden | Sept. 15, 1914 |
| 1,325,938 | Franks | Dec. 23, 1919 |
| 1,338,720 | Darr | May 4, 1920 |
| 1,439,239 | Hintze | Dec. 19, 1922 |
| 1,484,466 | Boydelatour | Feb. 19, 1924 |
| 1,746,870 | Ross et al. | Feb. 11, 1930 |
| 2,132,692 | Lawrence | Oct. 11, 1938 |